(12) United States Patent
Chung et al.

(10) Patent No.: US 6,741,862 B2
(45) Date of Patent: May 25, 2004

(54) ENHANCED REVERSE-LINK RATE CONTROL IN WIRELESS COMMUNICATION

(75) Inventors: Sae-Young Chung, Waltham, MA (US); Dae-Young Kim, Lexington, MA (US)

(73) Assignee: Airvana, Inc., Chelmsford, MA (US)

( * ) Notice: Subject to any disclaimer, the term of this patent is extended or adjusted under 35 U.S.C. 154(b) by 0 days.

(21) Appl. No.: 09/778,668

(22) Filed: Feb. 7, 2001

(65) Prior Publication Data

US 2002/0151310 A1 Oct. 17, 2002

(51) Int. Cl.[7] .............................. H04Q 7/20; H04B 1/00
(52) U.S. Cl. ................................. 455/452; 455/63
(58) Field of Search ............................. 455/452, 453, 455/458, 226.3, 226.2, 63, 67.1, 67.4, 562; 370/252, 335, 458, 468, 328, 329, 229, 230, 232, 233, 234, 235; 375/225

(56) References Cited

U.S. PATENT DOCUMENTS

| | | | | |
|---|---|---|---|---|
| 5,548,812 A | * | 8/1996 | Padovani et al. | 370/332 |
| 5,774,808 A | * | 6/1998 | Sarkioja et al. | 370/332 |
| 5,790,551 A | * | 8/1998 | Chan | 370/458 |
| 6,023,625 A | * | 2/2000 | Myers, Jr. | 455/446 |
| 6,088,335 A | * | 7/2000 | I et al. | 370/252 |
| 6,101,392 A | * | 8/2000 | Corriveau | 455/458 |
| 6,122,516 A | * | 9/2000 | Thompson et al. | 455/450 |
| 6,188,914 B1 | * | 2/2001 | Chheda | 455/561 |
| 6,324,401 B1 | * | 11/2001 | De Hoz Garcia-Bellido et al. | 370/331 |
| 6,373,878 B1 | * | 4/2002 | Palenius et al. | 370/335 |

* cited by examiner

Primary Examiner—Nguyen T. Vo
Assistant Examiner—Sheila B. Smith
(74) Attorney, Agent, or Firm—Fish & Richardson P.C.

(57) ABSTRACT

By controlling reverse rates among mobile stations to reduce reverse-link interference, reverse-link throughput can be increased.

52 Claims, 5 Drawing Sheets

ENHANCED REVERSE-LINK RATE CONTROL IN WIRELESS COMMUNICATION

BACKGROUND

We use the following acronyms in our discussion:

| | |
|---|---|
| 1xEV-DO | 1xEV-Data Only |
| 1xEV-DV | 1xEV-Data and Voice |
| 3GPP2 | 3rd Generation Partnership Project 2 |
| BS | Base Station |
| CDMA | Code Division Multiple Access |
| CDMA-2000 | A CDMA standard for voice and data |
| DRC | Data Rate Control |
| HDR | High Data Rate |
| IS-95 | TIA/EIA Interim Standard 95 |
| MS | Mobile Station |
| psd | Power Spectral Density |
| RA | Reverse Activity |
| RAE | Reverse Activity Bit |
| SIR | Signal-to-Interference Ratio |
| SNR | Signal-to-Noise Ratio |
| TDMA | Time Division Multiple Access |

We use the following notations in our discussion.

| | |
|---|---|
| $a_i$ | path gain from the i-th sector to a MS |
| $\alpha_R$ | relative data power over pilot for reverse rate R |
| $b_i$ | path gain from a MS to the i-th sector |
| $\beta$ | interference factor |
| $d_R$ | minimum required $E_b/I_0$ for reverse rate R |
| $E_b$ | energy per bit |
| $E_{b_i}$ | energy per bit for the i-th MS |
| F | base station noise figure |
| G | processing gain = W/R |
| $g_i$ | path gain from the i-th MS to the BS |
| I | psd of interference from other sectors |
| $I_0$ | psd of thermal noise and interference |
| $I_{0_i}$ | psd of thermal noise and interference for the i-th MS |
| $I_t$ | psd of the total received power at the BS |
| N | number of mobile stations in a sector |
| $N_{th}$ | psd of thermal noise |
| $P_i$ | pilot transmission power of the i-th MS |
| R | reverse rate |
| $R_i$ | reverse rate of the i-th MS |
| S | received signal power |
| $S_i$ | received pilot power of the i-th MS |
| W | system bandwidth |

Figure 1:
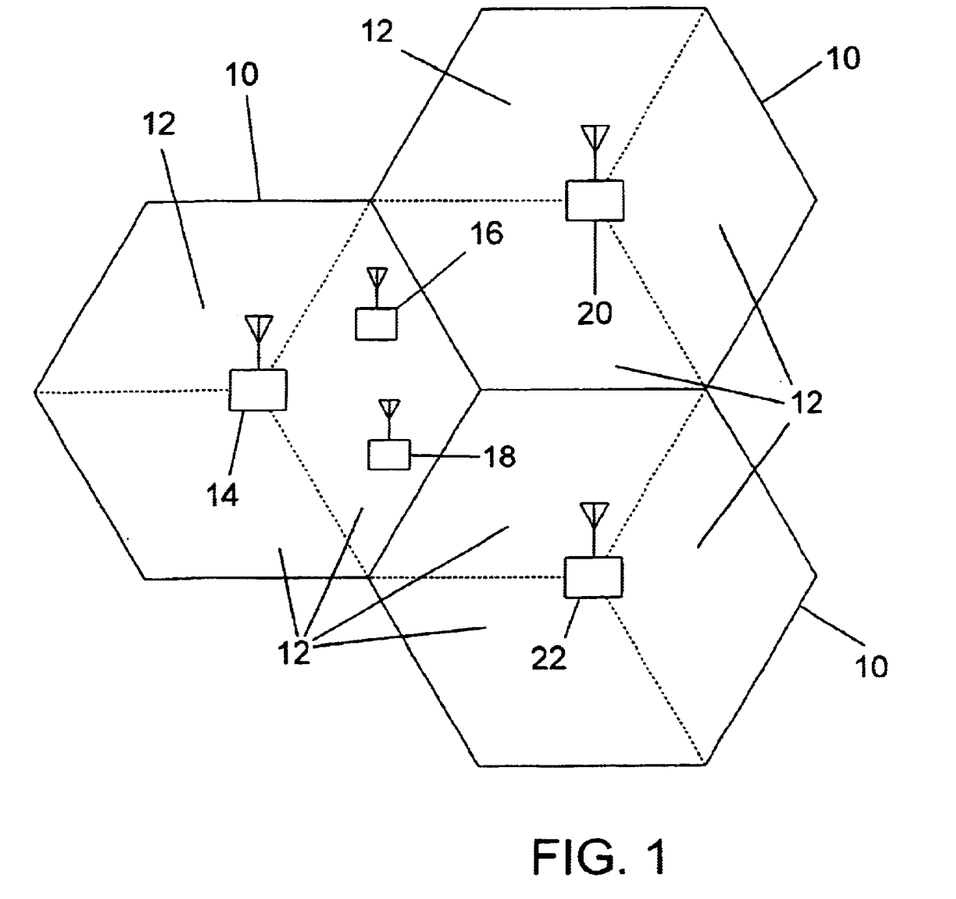
FIG. 1 shows cells and sectors.

FIG. 1 shows a general configuration of cellular wireless communication systems. A large geographic area is divided into cells 10. Each cell can be further divided into sectors 12. Typically three sectors per cell are used as shown in the figure. We will use the term sector even when there is only one sector per cell. In each cell, a BS 14, 20, 22 serves three sectors and communicates with multiple MS's 16, 18 in its cell.

High Data Rate (HDR) is an emerging mobile wireless access technology that enables personal broadband Internet services which can be accessed from anywhere, anytime. Developed by Qualcomm, HDR is a new air interface optimized for IP packet data services. HDR can deliver a shared forward link transmission rate of up to 2.4576 Mbit/s per sector using only (1x) 1.25 MHz of spectrum. HDR has been adopted by TIA as a new standard in the CDMA2000 family, an EVolution of the current 1xRTT standard for high-speed data-only (DO) services, formally referred to as 1xEV-DO or IS-856.

IS-856 defines AN, AT, and sector as follows:

Access Network (AN): The network equipment providing data connectivity between a packet switched data network (typically the Internet) and the access terminals. An access network is equivalent to a base station in the CDMA-2000 standard.

Access Terminal (AT): A device providing data connectivity to a user. An access terminal may be connected to a computing device such as a laptop personal computer or it may be a self-contained data device such as a personal digital assistant. An access terminal is equivalent to a mobile station in the CDMA-2000 standard.

Sector: The part of the access network that provides one CDMA channel.

We will use BS and AN interchangeably and MS and AT interchangeably.

In HDR, the forward-link channel is time-shared among MS's. Actual forward throughput becomes smaller than the instantaneous rates if there are more than one MS.

The MS periodically monitors the quality of its forward channels by measuring the forward-link SIR values from several sectors. The MS chooses the sector among active sectors whose SIR is the highest and calculates the maximum possible forward-link rate supported at this SIR. The MS then sends a DRC value in every slot (one slot is 1.66 msec) that indicates this rate to the BS. The following table shows the DRC value and the corresponding rate in Kbps. Packet length shows how many slots a forward packet needs at each rate.

| DRC value | Rate (kbps) | Packet Length in slots |
|---|---|---|
| 1 | 38.4 | 16 |
| 2 | 76.8 | 8 |
| 3 | 153.6 | 4 |
| 4 | 307.2 | 2 |
| 5 | 307.2 | 4 |
| 6 | 614.4 | 1 |
| 7 | 614.4 | 2 |
| 8 | 921.6 | 2 |
| 9 | 1228.8 | 1 |
| 10 | 1228.8 | 2 |
| 11 | 1843.2 | 1 |
| 12 | 2457.6 | 1 |

In HDR, the reverse link (from MS to BS) can support bit rates 9.6, 19.2, 38.4, 76.8, and 153.6 Kbps in a 1.25 MHz spectrum (no overlap with the forward-link spectrum). Since the reverse link is shared using CDMA, these are the actual rates each MS can get.

A MS can communicate with several sectors. A MS is in soft handoff if decoding of the reverse packet is done at several sectors and an error-free frame, if any, is finally chosen. A MS is in softer handoff, if several sectors in the same cell jointly decode the reverse packet.

Due to the unpredictable nature of the reverse traffic and delay, it is difficult to schedule individual reverse traffic together at the BS. As we will show later, there is a limit on the aggregate reverse rate in each sector at which MS's can send data reliably. Therefore, it is important to be able to control the reverse rate of each MS so that their aggregate rate rarely exceed the limit. We briefly describe how this is done in HDR.

In HDR, there are four variables for reverse rate control, i.e., MaxRate, CurrentRate, CombindedBusyBit, and CurrentRateLimit. CurrentRate is the actual rate at which a MS sent data last time. The BS can send broadcast (to all MS's in the sector) or unicast (to a specific MS) RateLimit messages. After receiving the RateLimit message (unicast or broadcast), the MS sets its CurrentRateLimit equal to the RateLimit value. CurrentRateLimit is initially 9.6 Kbps.

The BS can send another broadcast control signal, RAB (reverse activity bit), to all active MS's. The MS collects all RAB's from active base stations and determines CombinedBusyBit. The CombinedBusyBit is 1 if any of these RAB's is 1 and is 0 otherwise. The MS then computes the MaxRate with a certain probability depending on the CombinedBusyBit. This probability is a function of both the CurrentRate and the CombinedBusyBit. The MS then chooses a rate that does not exceed either of MaxRate or CurrentRateLimit. The rate is also limited by the transmission power of the MS (in general more power is needed for transmitting at a higher rate). If the payload size is small enough to be transmitted using a lower rate, then the MS choose the lower rate. The following summarizes the reverse rate variables:
CurrentRateLimit 1. initially 9.6 Kbps
2. after receiving broadcast or unicast RateLimit message, an MS updates it as follows:
   a. if the RateLimit<=CurrentRateLimit, set CurrentRateLimit=RateLimit immediately.
   b. if the RateLimit>CurrentRateLimit, set CurrentRateLimit=RateLimit after one frame (16 slots).

CombinedBusyBit 1 if and only if any RAB is 1 from any sector.

MaxRate 2.0*CurrentRate if CombinedBusyBit=0 and with probability x.

0.5*CurrentRate if CombinedBusyBit=1 and with probability x.

MaxRate cannot be set to 0 in any case.

MaxRate cannot exceed 153.6 Kbps.

MS selects a transmission rate (becomes CurrentRate) such that 1. rate<=MaxRate
2. rate<=CurrentRateLimit
3. rate<=highest rate that can be accommodated by the transmission power
4. rate<=highest rate such that the number of minimum payload bits is less than the number of bits to send.

Default values of the transition probability x are:

| CombinedBusyBit | CurrentRate | MaxRate | Default probability |
|---|---|---|---|
| 0 | 9.6 kbps | 19.2 kbps | 0.75 |
| 0 | 19.2 kbps | 38.4 kbps | 0.25 |
| 0 | 38.4 kbps | 76.8 kbps | 0.125 |
| 0 | 76.8 kbps | 153.6 kbps | 0.125 |
| 1 | 19.2 kbps | 9.6 kbps | 0.25 |
| 1 | 38.4 kbps | 19.2 kbps | 0.25 |
| 1 | 76.8 kbps | 38.4 kbps | 0.5 |
| 1 | 153.6 kbps | 76.8 kbps | 1 |

SUMMARY

In general, in one aspect, the invention features a method that includes (a) at a mobile wireless communication device operating in a cell, transmitting data to sectors, and (b) at the base station controlling the reverse data rate of the mobile device based on an estimated amount of interference the mobile device is causing to other sectors. Implementations of the invention may include one or more of the following features. The estimated amount of interference is based on a forward-link SIR for the mobile device. The forward-link SIR is averaged over a period of time. The estimated amount of interference is based on pilot power from the mobile device received at the base station or on total power received from the mobile device at the base station or on the mobile device's request forward-link data rate. The request data rate is averaged over a certain period of time. The reverse rate of the mobile device is set by the base station. The reverse rate is set as a target rate based on the queue status of the mobile device or on the status of the sector in which the mobile device is operating. The status of the sector comprises a number of mobile devices or a reverse rate of other devices operating in the sector. The reverse rate of the mobile device is set by the mobile device. The reverse rate is set based on a determined rate limit. The rate limit is communicated to the mobile device from the base station. The reverse rate is limited by sending rate control bits from the base station to the mobile device. The mobile device sets a value of MaxRate according to a message from the base station, the MaxRate being dependent on the current rate of the mobile device and given transition probabilities. The mobile device sets a MaxRate deterministically. The aggregate rate from all mobile devices in all sectors is maximized. The rate of each mobile device is restricted by a condition. The condition includes fairness among the mobile devices.

In general, in another aspect, the invention features a method that includes (a) generating one or more reverse rate control bit or bits for each of several mobile devices operating in a sector of a cell, and controlling the reverse rates of the respective mobile devices based on the reveres rate control bits.

In general, in another aspect, the invention features a method that includes (a) at a mobile wireless communication device operating in a sector of a cell, transmitting data to the base station in the sector, and (b) controlling its reverse data rate based on an estimated amount of interference the mobile device is causing to base stations in other sectors. Implementations of the invention may include one or more of the following features. The estimated amount of interference is based on its forward-link SIR. The estimated amount of interference is based on its forward-link rate. The estimated amount of interference is based on its request forward-link data rate. The estimated amount of interference is based on the received power from the base station. The reverse rate is limited by a command from the base station.

Other advantages and features will become apparent from the following description and from the claims.

DESCRIPTION

Compared to IS-95 or CDMA-2000, it is possible to achieve about two to three times more aggregate throughput in the forward link in HDR using the same 1.25 MHz spectrum. In addition to employing higher order modulation, such as 8PSK and 16QAM, the increase in throughput is attributable the following.

Delay sensitive voice traffic requires the same average rate among MS's which forces the BS to increase its transmission power when a MS's forward channel degrades (for example, when the MS is moving away from the BS). To guarantee the same rate for all MS's independent of their channel condition, a MS operating in a bad channel condition takes up a lot of resources (i.e., power in the case of CDMA systems such as IS-95 and CDMA-2000), and this results in lower aggregate throughput. By contrast, a HDR system in which all MS's get about the same resources (i.e., time in the case of TDMA systems such as in the HDR forward link) independent of their respective channel conditions can achieve higher aggregate throughput because a MS operating in a good channel condition gets higher throughput. In this case, the forward-link rate becomes a function of the forward-link SIR that the MS is experiencing.

HDR gets similar reverse-link rates compared to IS-95 or CDMA-2000 and thus fails to achieve the two to three times throughput improvement of the forward-link. Throughput can be improved using enhanced reverse link rate control schemes. We first show how to improve reverse link throughput of a HDR system using the control signals and messages defined in HDR standard. We also show how to improve reverse link throughput in cellular systems including HDR by adding new control signals in the standard.

1. Reverse Link Capacity

We first calculate the reverse link capacity of a HDR system using the same method described in K. I. Kim, Handbook of CDMA System Design, Engineering, and Optimization, Prentice Hall, 2000 to calculate the reverse link capacity of IS-95. $E_b$ is the energy per bit and $I_0$ is the power spectral density of the combined thermal noise $N_{th}$ and interference. Since the spectral efficiency of the channel is very low, we are operating in a power-limited regime. In this case, the channel capacity is nearly proportional to the SNR. We assume that at least $E_b/I_0 = d$ is required for error-free transmission. For example, if a convolutional code is used, then we use d=7 dB. If a more powerful turbo code is used, then we use d=3 dB.

The receiver at the base station introduces some additional noise, which effectively magnifies $N_{th}$ by F. For now, we assume that the received power S for each MS is the same, which is the case when the uplink rate of each MS is the same and when the reverse link power control is perfect. Similarly, we assume R is the common bit rate of each MS. If there are N MS's in a cell, then the in-cell interference comes from N−1 of the MS's. Let β denote the interference factor from MS's in other sectors/cells, i.e., the total interference from other sectors/cells is β times the total in-cell interference. For example, β=0.6 can be used for a single-sector cell and β=0.85 can be used for a sectored cell. Finally, let W denote the system bandwidth and let G denote the processing gain defined as W/R.

Using these quantities, we can calculate the $E_b/I_0$ value as follows.

$$\frac{E_b}{I_0} = \frac{S/R}{FN_{th} + \frac{(1+\beta)(N-1)S}{W}} = G \frac{S}{FN_{th}W + (1+\beta)(N-1)S}. \quad (1)$$

Since $E_b/I_0 \geq d$, we have an upper bound on N, i.e., $$N \leq N_{max} = \frac{G}{d(1+\beta)} + 1 - \frac{FN_{th}W}{(1+\beta)S}.$$

Similarly, the rate R is upper-bounded by the following:

$$R \leq R_{max} = \frac{SW}{FN_{th}Wd + (1+\beta)(N-1)Sd}.$$

Assuming the mobile stations have unlimited power, we can simplify the above two bounds, because we can ignore the thermal noise, i.e., $$N \leq N_{max} = \frac{G}{d(1+\beta)} + 1, \quad (2)$$

$$R \leq R_{max} = \frac{W}{(1+\beta)(N-1)d}.$$

This capacity is called the pole point or power pole. Note that (N−1) and R are inversely proportional to each other when the inequalities are met with equality.

For example, if N=10, W=1.25 MHz, d=3 dB, β=0.85, then $R_{max}$ is equal to about 37 kbps. $N_{max}$ for the same parameter becomes about 3.2, 5.4, 9.8, 18.6, and 36.2 for R=153.6, 76.8, 38.4, 19.2, and 9.6 kbps, respectively.

Using the definition of $N_{max}$ in (2), we get from (1)

$$S \geq \frac{FN_{th}W}{(1+\beta)(N_{max}-N)}. \quad (3)$$

Therefore, the received power needs to be increased as N increases.

In the following section, we consider the case when MS's can have different rates and there is some overhead in sending pilots.

2. Users with Different Rates

If MS's have different rates, i.e., $R_i$ for MS i, then the above bounds can be modified as follows. Let $g_i$ be the path gain from the i-th MS to the BS. Let $P_i$ be the pilot transmission power from MS i and let $\alpha_{R_i}$ be the relative data power over the pilot power when the rate is $R_i$. In this case, we get the i-th MS's SNR [$E_{bi}/I_{0i}$] as follows:

$$\left[\frac{E_{bi}}{I_{0i}}\right] = \frac{g_i^2 P_i \alpha_{R_i} W / R_i}{(FN_{th}+I)W + \sum_{j=1, j\neq i}^{N} g_j^2 P_j (1+\alpha_{R_j})} \geq d_{R_i},$$

where $d_{R_i}$ is the minimum required SNR for rate $R_i$, and I is the psd of the interference from other sectors. Let $S_i = g_i^2 P_i$ be the received pilot psd from MS i and let $I_t = (FN_{th}+I) + \Sigma_{j=1}^{N} g_j^2 P_j (1+\alpha_{R_j})/W$ be the total received psd. If $r_i$ is defied as the ratio of the received pilot psd and the total received psd, i.e., $$r_i = \frac{S_i}{I_t},$$

then the minimum required $r_i$ is given by the following:

$$\left[\frac{E_{bi}}{I_{0i}}\right] = \frac{\alpha_{R_i} W / R_i}{\frac{1}{r_i} - 1 - \alpha_{R_i}} \geq d_{R_i}.$$

In general, $r_i$ is a function of the rate $R_i$. If $r_i$ is not a constant, then the outer-loop power control needs to know the instantaneous reverse rate $R_i$, which may increase the complexity and introduce some delays. For optimal power allocation, $\alpha_{R_i}$'s and $r_i$'s need to be optimized dynamically among all MS's, which is even more complex to do. One simple way to avoid this problem is to set $r_i$ equal to a constant $r_0$ for all MS's, which will force the received pilot power the same for all MS's in the sector. To maintain the minimum required SNR for the pilot, we need to set $r_0$ higher than the SNR. Once the value of $r_0$ is determined, $\alpha_R$ can be calculated as follows:

$$\alpha_R = \frac{1/r_0 - 1}{1 + W/Rd_R}. \quad (4)$$

Note that if we want to keep the ratio $f_0$ of the pilot psd $S_i$ and the interference psd $(FN_{th}+I)+\Sigma_{j=1,j\neq i}^{N}g_j^2P_j(1+\alpha_{R_j})/W$ the same for all MS's at the receiver, then we get different $\alpha_R$'s as follows:

$$\alpha_R = \frac{Rd_R}{Wf_0}. \quad (5)$$

The difference in $\alpha_R$'s in (4) and (5) should be small since $r_0 \ll 1$ and $W/Rd_R \gg 1$ in a HDR system. In any case, $\alpha_R$ should not be larger than a certain number so that the minimum pilot power corresponding to the rate can be maintained.

3. Basic Rate Control Scheme

Because RateLimit messages consume a significant portion of the forward traffic channel bandwidth, it is not desirable to send them every time we want to control the reverse-link rates. Instead, we need to rely on RABs for short-term rate control. One way to do this is to use a RateLimit message when a new MS is entered or a MS is moved out and to use RABs for controlling the rate assuming the number of MS's is fixed. We can also use RateLimit messages when the rates need to be decreased quickly.

The value of RateLimit depends on the reverse traffic pattern. If each MS's queue is always fall, then RateLimit can be set to be slightly larger than the maximum average per-user rate $R_{max}$. If the reverse traffic is lightly loaded, then we need to increase RateLimit more so that high-rate bursty reverse data can be transmitted. Because RateLimit is discrete, if we set all MS's RateLimit to be equal, then we cannot fine tune the total RateLimit. In this case, we may want to send unicast RateLimit messages to set RateLimits differently among MS's so that the total RateLimit can be the desired number. The actual value of $R_{max}$ will depend on $\beta$ and the number of MS's in soft and softer handoff, but it will not change much normally.

One possible control scheme for RAB is to set it to 1 if the total rate measured for a certain period of time is greater than a threshold and to 0 otherwise. This threshold should be smaller than capacity; otherwise it could cause many frame errors.

4. Rate Control Based on Forward Traffic Rate

To achieve a certain rate, the received power of a MS at the BS should be the same independent of the MS's location. Therefore, a MS far from the base station has to increase its transmission power. Furthermore, its pilot arrives at the base station with equal power among MS's assuming the power control scheme in Section 2 is used.

A MS far from the serving BS is near to the neighboring BS's (compared to a MS near to the serving BS) and causes more interference. Therefore, a plausible strategy is to allocate less rate (as a result, lowering its transmission power) for those MS's who should transmit at higher power so that they do not become significant sources of interference to neighboring cells. However, there is no explicit signaling information that enables the BS to know what the MS's transmit power is nor its location within the cell. One possible approach is to make the reverse rate roughly proportional to the corresponding forward-link rate, which will be as fair as the forward link. To demonstrate how this scheme can reduce the interference to other cells/sectors, we first consider the following example.

Figure 2:
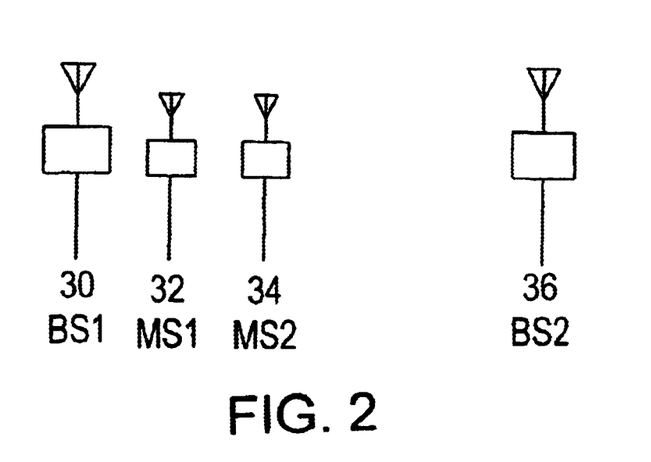
FIG. 2 shows two BSs and two MSs.

Assume there are two base stations 30, 36 in FIG. 2 separated by distance 1, and two MS's are located 0.2 (MS 1, 32) and 0.4 (MS 2, 34) from the first base station 30 on the line connecting the two base stations. Assume that the MS's transmission power is proportional to its reverse rate. If MS 2's reverse rate is 10 times MS 1's reverse rate, then MS 2's transmission power is $$10 \times \frac{0.4^{3.5}}{0.2^{3.5}} \approx 113$$

times MS 1's transmission power. Let P be MS 1's transmission power. Then the interference to the base station 2 is equal to $$a\left(\frac{P}{0.8^{3.5}} + \frac{113P}{0.6^{3.5}}\right) = 678P\alpha,$$

where $\alpha$ is a constant.

If we exchange MS 1 and 2's reverse rates, then the transmission power of MS 1 becomes 10 P and the transmission power of MS 2 becomes 11.3 P. The total reverse throughput is unchanged. However, the interference to the base station 2 now becomes $$a\left(\frac{10P}{0.8^{3.5}} + \frac{11.3P}{0.6^{3.5}}\right) = 89P\alpha,$$

which reduces the interference by about 9 dB.

This can be easily implemented in an HDR system based on our observation that the amount of interference a MS is causing to other base stations can be estimated somewhat accurately from its forward-link SIR. Each BS knows the forward-link data rate of each MS as reported by a DRC value from each MS. This information can be used to adjust the reverse-link data rate as a function of the corresponding forward-link rate of the MS. The initial reverse link rate of a MS when it makes a connection can be set using the pilot strength field in Route update message.

Let $a_i$ and $b_i$ be the forward and reverse link path gains (including path loss and fading) from/to the i-th sector to/from a MS of interest, respectively. Let i=0 be the sector that is serving the MS (sending and receiving data to and from the MS). We will describe later the case when sectors sending and receiving data to and from the MS are different and also the case when the MS is in soft or softer handoff. Let M be the total number of sectors. Then, the forward-link SIR $SIR_F$ is defined as follows (ignoring thermal noise at the MS):

$$SIR_F = \frac{a_0^2}{\sum_{i=1}^{M} a_i^2}.$$

Similarly, we can define reciprocal reverse-link SIR $SIR_R$ as follows:

$$SIR_R = \frac{b_0^2}{\sum_{i=1}^{M} b_i^2}.$$

Note that this is not the actual reverse-link SIR. It is only defined for convenience to represent how much reverse interference the MS's are generating: When $SIR_R$ is smaller, more interference is generated by MS's.

The wireless channel is modeled using three components: path loss, shadow fading, and fast fading (a.k.a. Rayleigh fading) (See T. S. Rappaport, Wireless Communications, Principles and Practice, Prentice Hall 1996.) The path loss and shadowing of forward link and reverse link is about the same when the carrier frequencies of the forward link and the reverse link are about the same. Fast fading is the part that can be quite different for forward and reverse links.

When a MS is moving at high speed, Rayleigh fading will have only an average effect and the forward and reverse links will have similar path loss, i.e., $a_i \approx b_i$ for $i=0, \ldots, M$. Therefore, in this case, $SIR_F$ and $SIR_R$ will be similar.

If a MS is stationary or is moving very slowly, the two links could have quite different instantaneous Rayleigh fading values, which makes the prediction of the reverse-link path loss based on the forward-link path loss less accurate than the other case. In this case, $SIR_F$ and $SIR_R$ can be significantly different, because their numerators can be very different although the difference in their denominators are expected to be smaller due to the law of large numbers.

In the next section, through simulation, we show the accuracy in predicting the total amount of interference a MS is causing to other base stations in these two cases. For the first case, we will assume that there is no Rayleigh fading but there is only $1/d^{3.5}$ path loss and shadow fading that are the same for forward and reverse links. For the second case, we will assume there is Rayleigh fading that is independent in forward and reverse links.

Let P be the pilot transmission power and let R be the reverse rate of this MS. Then, the total interference this MS is causing to other BS's is equal to $$\sum_{i=1}^{M} b_i^2 P(1+\alpha_R). \tag{6}$$

Since $\alpha_R$ is almost proportional to R, to reduce this interference, we can assign higher rates for MS's that cause lower interference and assign lower rates for MS's that cause higher interference. Therefore, it is necessary to measure the interference for each MS.

However, direct measurement of (6) is difficult, because every BS has to measure each term of (6) and needs to send the information to the BS that is serving the MS (BS 0 in this case).

Assuming $SIR_F$ is similar to $SIR_R$, we can use the following relationship to estimate (6):

$$\sum_{i=1}^{M} b_i^2 P(1+\alpha_R) \approx \frac{b_0^2 P(1+\alpha_R)}{SIR_F}.$$

To control the reverse rate R of the MS depending on how much interference it is causing to other sectors, we can estimate $$\sum_{i=1}^{M} b_i^2 P$$

and use it to control R. Using the above approximation, we can represent this as follows:

$$\sum_{i=1}^{M} b_i^2 P \approx \frac{b_0^2 P}{SIR_F}. \tag{7}$$

This estimation requires $SIR_F$ and $b_0^2 P$. $b_0^2 P$ can be calculated at the BS by measuring either the received pilot power or the received total power from the MS. The BS can estimate $SIR_F$ from the DRC value it is receiving from the MS. The uncertainty in (7) can be reduced by averaging $SIR_F$ for some time period. In the following section, we show how to assign reverse rates depending on the above estimate and show how much gain we can obtain in the reverse-link throughput.

When a MS is in soft handoff, the BS sending the forward traffic to the MS could be different from the BS that can decode the reverse traffic with the least probability of error. In this case, we assume the following approximation holds:

$$\sum_{i=0, i \neq k}^{M} b_i^2 P \approx \frac{b_k^2 P}{SIR_F}, \tag{8}$$

where k is the index of the BS that can decode the reverse traffic with the least probability of error. Approximation (8) seems to be far less accurate than (7) when the forward and reverse channels are very different. However, our simulation results in Section 7 shows that this is good enough for improving the reverse-link rate.

Since it is not always possible to decide which BS can decode the reverse traffic with the least probability of error, we may choose one of BS's that decoded the reverse traffic correctly most recently.

Now, our goal is to minimize the aggregate interference these MS's are causing to other BS's (defined as all BS's except the one that decodes the reverse traffic of the MS with the least probability of error) while maintaining the same aggregate rate. Equivalently and more desirably, we can maximize the aggregate rate while maintaining the same per-sector aggregate interference to other BS's. Without any other restriction, the solution to this problem will be to allocate the maximum rate to the user in each sector who is causing the least interference to other BS's. However, this is not fair.

Furthermore, it would be difficult to do global optimization among all BS's, since it requires so much exchange of information. Instead, we can maximize the rate in each sector separately while maintaining the same interference to other BS's. Since the amount of interference to other BS's remains the same in this case, the global optimization is equivalent to the distributed optimization.

To introduce some fairness, we consider the following. Let $_i$ be the ratio of predicted reverse and forward data rates of the i-th MS. For example, $_i$ will be close to one if the traffic is two-way communication such as audio or video streams. It will be less than one for ftp or web clients and would be greater than one for web server applications. The following example gives a restriction on allowed rates for the MS.

$$\mu_{i,min} \le \frac{R_i}{F_i} \le \mu_{i,max},$$

where $_{i,min}$ and $_{i,max}$ are the minimum and maximum allowed ratio of reverse and forward rates $R_i$ and $F_i$, respectively. The values of the minimum and maximum ratio can be set to be less and greater than $_i$, respectively, by some margin. If the optimization problem becomes infeasible, then we may have to increase this margin. There will be other constraints on the reverse rate, since it is quantized. If we do not have the model of the traffic pattern, then we can simply use the average ratio of reverse and forward traffic for all MS's for $_i$. Now, per-sector optimization can be done by maximizing the aggregate reverse rate in the sector given the same aggregate interference caused by all MS's in the sector to other BS's and the above fairness condition. Note that there are many other ways to introduce fairness.

In the following section, we consider simpler schemes for increasing reverse throughput.

5. Implementation

In this section, we show how to use (7) or (8) for reverse rate control.

5.1 When Reverse Traffic is Scheduled at the BS

In a system where the AN schedules every MS's reverse traffic and sets every MS's reverse rate, our rate control algorithm would be easier to implement and more effective. However, this scheme requires every MS to send the status of its reverse queue to the AN periodically, which will consume some reverse bandwidth. Also, this requires some forward bandwidth to send commands to set MS's reverse rates.

Figure 5:
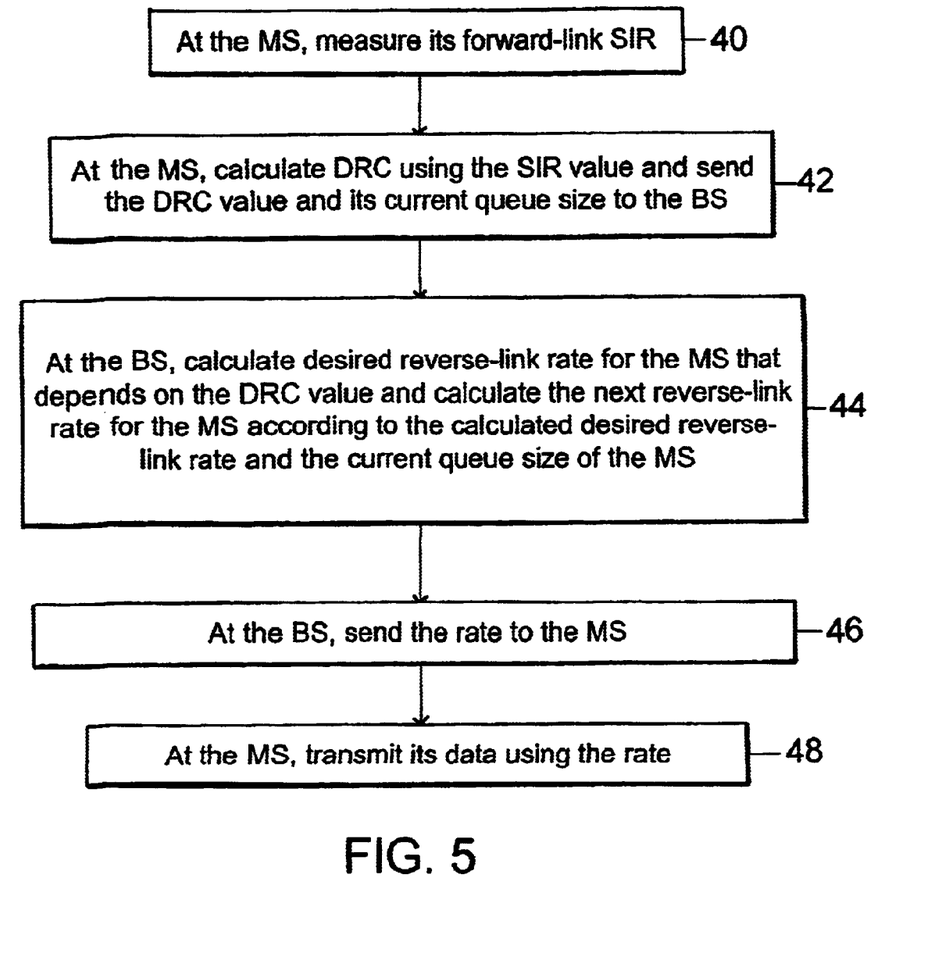
FIGS. 5 and 6 are process flow diagrams.

The overall process is illustrated in FIG. 5. The MS measures its forward-link SIR 40. The MS calculates DRC using the SIR value and sends the DRC value and the MS's current queue size to the BS 42. The BS calculates the desired reverse-link rate for the MS that depends on the DRC value and calculates the next reverse-link rate for the MS according to the calculated desired reverse-link rate and the current queue size of the MS 44. The BS sends the rate to the MS 46. The MS transmits data using the indicated rate 48.

To set these reverse rates, we can simply send per-user rate control bits (rate up/down) to each MS periodically. Since MS's do not need to adjust their rates within a frame (26.66 msec=16 time slots) in the case of HDR, we only need to send one rate control bit per MS in every Ls slots, where Ls 16. If it is necessary to send two or more rate control bits within a frame to change the rate fast, then Ls could be less than 16.

This can be implemented in the current HDR standard with a minor modification by puncturing reverse power control (RPC) bits, which are also sent per MS, i.e., we replace one or more RPC bits with this new rate control bit in every Ls time slots for every MS. The number of RPC bits replaced could be increased when the MS's forward-link SIR is bad. The fraction of the power allocated to these rate control bits could be higher than that of the RPC bits. In this case, it is necessary to lower the power of other RPC bits directed to other MS's in the same time slot to maintain the total power equal to the pilot power of the forward-link in HDR. In this case, it is necessary to distribute rate control bits for different MS's evenly among Ls slots so that there are small number (preferably one or zero) of rate control bits in every time slot. Note that there is no need to have RAB in this case, permitting an increase in the power allocated to RPC and rate control bits.

Because there is a possibility that these rate control bits will be decoded incorrectly, the AN needs to monitor the actual reverse rate and needs to correct the rate if it is not equal to the desired rate.

5.2 When Reverse Traffic is Scheduled at the MS

In this case, the reverse traffic is scheduled in a distributed way, i.e., each MS determines its own reverse rate as in HDR. Because it is necessary to limit the maximum reverse rate to maintain a certain frame error rate, the BS needs to send some commands to limit the rate. In HDR, this is implemented using two sets of commands, i.e., RateLimit and RAB.

If a MS's queue is fall, then it will always send data at the highest rate it was given. Otherwise, its rate could fluctuate from as low as zero to the specified rate limit. Therefore, in this case, we have less control over the actual rates of MS's.

Figure 6:
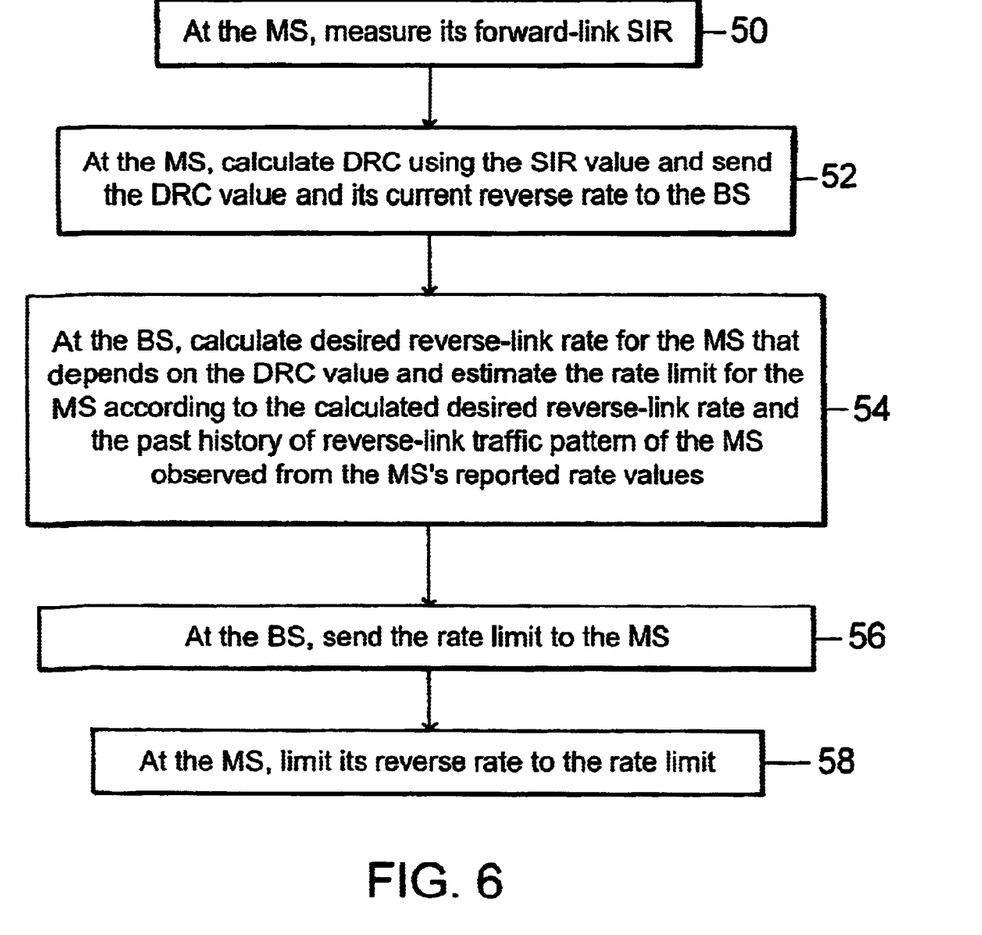

The overall process is illustrated in FIG. 6. The MS measures its forward-link SIR 50. The MS calculates DRC using the SIR value and sends the DRC value and the MS's current reverse rate to the BS 52. The BS calculates the desired reverse-link rate for the MS that depends on the DRC value and esteimates the rate limit for the MS according to the calculated desired reverse-link rate and the past history of reverse-link traffic pattern of the MS observed from the MS's reported rate value 54. The BS sends the rate limit to the MS 46. The MS limits its reverse rate to the indicated rate limit 58.

To implement our rate control scheme conforming to the HDR specification, we can set the RateLimit in bps of the i-th MS roughly proportional to its own forward-link DRC $D_i$ in bps, and inversely proportional to the number N of MS's in the sector, i.e., set its RateLimit equal to $$\left\lfloor c \frac{D_i}{N} + d \right\rfloor,$$

where c and d are variables that depend on N and the MS's traffic pattern and $\lfloor x \rfloor$ is the largest possible RateLimit value for a rate that is not bigger than x. In general, c needs to be increased/decreased as the reverse traffic pattern is bursty or flat, respectively. d is usually the minimum RateLimit value, i.e., in the case of HDR it is 9.6 kbps. In this case, forward-link bandwidth is sacrificed because RateLimit messages require several time slots for transmission. Thus, RAB should be used together with RateLimit messages for faster control of the aggregate reverse rate.

The cost of sending many RateLimit messages can be avoided by sending per-user rate control bits as in the previous section, which requires a minor change of the HDR specification. Because MS's are scheduling their own traffic, the exact rate cannot be specified by the BS. Instead, we can control rate limit using these commands.

There are many ways of limiting the rate using these rate control bits. First, we can use them as per-user RA bits, i.e., when a MS gets a rate control bit, it changes its MaxRate according to its CurrentRate and some transition probabilities as is done in HDR except that now it is done per user.

Another way is to define a two-bit rate control command per user (rate up/down/no change) and eliminate the transition probability, i.e., the MS always responds to the command and changes its MaxRate relative to its CurrentRate with probability one. When the rate control bit indicates rate up, then the MS sets its MaxRate to two times its CurrentRate or 153.6 kbps, whichever is lower. When the MS gets a rate down command, then it lowers its MaxRate to ½ of its CurrentRate or 9.6 kbps, whichever is higher. When the command is "no change," then the MaxRate becomes CurrentRate or 9.6 kbps, whichever is higher. The command "no change" can be eliminated so that the rate control becomes only one bit.

We can still use RateLimit messages with these rate control commands in any case.

When a MS does not have enough data to send, it will lower its CurrentRate. In this case, MaxRate will be also lowered, even if the rate control command is "no change." When the MS needs a higher rate than its MaxRate, it has to wait for the next rate up command to increase its rate. Because the BS does not know which MS wants higher rate, it can try to send rate up messages to some MS's periodically (probing) to see if the MS's increase their rates. If a sector is fully loaded, then we may have to send rate down message to some other MS's at the same time to prevent overflow of the aggregate rate. This would introduce some delay in getting the desired rate, but the same problem exists in HDR where rate transition is made probabilistically.

When a MS is in handoff, it gets several rate control commands from active sectors. If any of these commands is "down," then the MS needs to lower its MaxRate to ½ of its CurrentRate or 9.6 kbps, whichever is higher. If all of the commands are "up," then the MS increases its MaxRate to two times its CurrentRate or 153.6 kbps, whichever is lower. Otherwise, the MaxRate is equal to its CurrentRate or 9.6 kbps, whichever is higher, if "no change" command is supported.

If a MS is in handoff, then the above "probing" becomes more complicated because many sectors need to cooperate to send rate up command to the MS from all of these sectors. This problem can be eased if sectors that are far from the MS are programmed to send rate "up" command if the received pilot power from the MS is smaller than a certain threshold. In some cases, the rate control commands from sectors far from the MS become corrupted and unusable. Because the MS can detect the channel condition of each rate control command, it can be programmed to ignore some of the commands that are more likely to be in error, which would help the coordination by reducing the number of sectors involved in the coordination. However, the problem still exists if there are many sectors that can send reliable rate commands to the MS.

In summary, by using per-user rate control, we can eliminate the probabilistic nature of rate control due to RAB and we can achieve faster per-user rate control (compared to the case in which the HDR specification is not changed, i.e., using RateLimit messages) that is more suitable for the rate control scheme using forward-link SIR.

We can implement a part of the rate control in the MS, because the MS knows its forward-link SIR and it can use it to limit its reverse rate, i.e., it can control its rate as a function of its forward-link SIR, its actual forward-link rate, received power from the BS, and additional rate commands from the BS. The BS still needs to control rates to maintain the aggregate at the desired level.

6. Other Performance Considerations

This enhanced scheme seems to be similar to limiting the transmission power of MS's because MS's will not choose rates that need more power than the MS can support. However, the proposed scheme can do more than this. If cell sizes are small, then the transmitter power does not restrict the rate anymore and any rate up to RateLimit is possible for every MS. For example, the nominal reduction in the maximum distance from the BS when the reverse rate is changed from 9.6 kbps to 153.6 kbps is about 55% assuming $1/d^{3.5}$ path loss. Therefore, the difference in the cell sizes between these two cases is only about two. Furthermore, when a MS is near a BS and is on the sector boundary when there are multiple sectors in a cell, the MS will transmit with a very low power, but will be a significant source of interference to the neighbor sector in the cell. (Softer handoff can have some improvements in this case.) In these two cases, we can still increase the average throughput by using our enhanced scheme. Our enhanced scheme is more universal in this sense.

Secondly, this enhanced scheme makes the reverse-link rate roughly proportional to the corresponding forward-link rate, which is fair in some sense and efficient for interactive applications which require proportional forward and reverse link rates, such as web browsing and telnet. The enhanced scheme also allows more symmetric traffic such as voice over IP and video conferencing because it can reduce the imbalance between forward and reverse links by increasing the reverse-link throughput.

When the number of MS's in a sector approaches capacity and every MS always has data to send, then each MS can get only 9.6 kbps. Because 9.6 kbps is the lowest non-zero reverse rate supported in the current HDR standard, the maximum number of MS's supported is limited. To increase the number of active MS's in this case, we need to have lower rates than 9.6 kbps. One way to do this is to send zero RateLimit values to some MS's for a certain period of time. We can alternate which MS's get zero RateLimit. In this case, any effective rate from 0 to 9.6 kbps is possible and each MS can have different effective rates. This cannot be done using RAB, because MaxRate cannot be zero.

Sending many RateLimit messages for this purpose would consume a lot of forward-link bandwidth. This can be avoided by doing per-user rate control as described above if we allow zero MaxRate, in which case RateLimit messages are used for slower rate control. The proposed scheme can be also applied to this case, i.e., MS's with lower forward-link SIR will be turned off for a longer period of time (lower effective rate), which will boost the reverse throughput compared to the case when the effective rates are allocated randomly among MS's.

Even when a MS's reverse-link traffic is light and if its forward-link rate is low (this would be the case when the MS does not have much data to send because its forward-link rate is low), the MS could choose a high reverse rate when it has a large packet to send, which would cause large interference. This can be prevented in the enhanced scheme, because the reverse rate will be limited.

We can now support higher reverse rates such as 307.2 and 614.4 kbps in HDR using our proposed scheme, because these high rates will only be allowed for MS's that have high forward-link SIR and do not usually become significant sources of interference to other sectors.

7. Simulation Results

The following assumptions are used in this simulation:
1. 241 hexagonal cells
2. Three sectors in each cell. Total number of sectors is 723.
3. $1/d^{3.5}$ path loss
4. Shadow fading with standard deviation 8 dB. Soft handoff is used for the reverse link based on the path loss and fading. No softer handoff is used.
5. Path loss and shadow fading are fixed during a simulation. They are also assumed to be the same for the forward and reverse links between a BS and a MS.
6. Each MS picks the best serving sector for the forward traffic.

7. Eight MS's in each sector. Total number of MS's is 5784.

Uplink data rates for eight MS's are randomly assigned among 9.6, 19.2, 38.4, 76.8, and 153.6 kbps in every sector subject to the maximum aggregate reverse rate of 240 kbps in each sector. Power allocated to data relative to pilot power is 3.75, 6.75, 9.75, 13.25, and 18.75 dB for rates 9.6, 19.2, 38.4, 76.8, and 153.6 kbps, respectively. These are default values in cdma2000 High Rate Packet Data Air Interface Specification, 3GPP2 C.S0024, Version 2.0, Date: Oct. 27, 2000.

8. Center 127 cells (or 381 sectors) are used for SIR measurements.
9. SIR values are measured by running the above simulation ten times with different MS locations and different shadow fading.
10. Every MS is moving at high speed (scenario A, we assume no Rayleigh fading in this case assuming it has only an average effect) or they are stationary or moving very slowly (scenario B, we assume independent Rayleigh fading in the two links).

Figure 3:
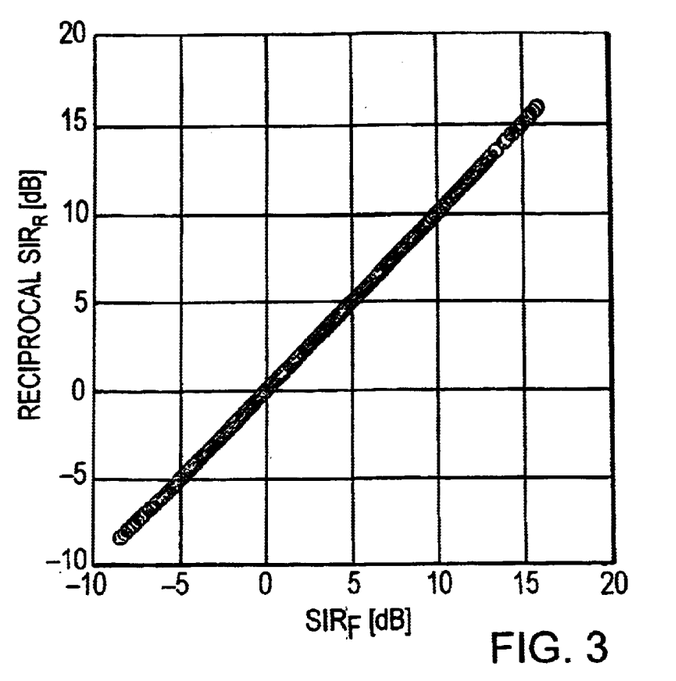
FIGS. 3 and 4 are correlation diagrams.

FIG. 3 shows the correlation between the forward-link SIR $SIR_F$ and the reciprocal reverse-link SIR $SIR_R$ for some MS's for scenario A. The correlation between these two SIR's is one because we are assuming the same path loss and shadow fading and no Rayleigh fading.

We now assign reverse rates depending on each MS's forward-link SIR. For easy comparison, we keep the same set of rates in each sector. This will make the total received power from the eight MS's in each sector the same. This will also make the reverse-link SIR of each MS with the same rate the same assuming no change in the interference from other sectors. We now assign higher rate for MS's with higher forward-link SIR by sorting the forward-link SIR (or forward-link rate). This can be realized by sending UnicastReverseRateLimit messages to MS's, assuming MS's always have data to send and they choose the maximum rate available. Otherwise, we can set the RateLimit of each user higher than the desired level, which will be discussed later.

The following table summarizes the improvement in the performance by using the proposed rate control scheme. Actual average aggregate reverse-link throughput per sector is about 206 kbps.

| Interference from the same sector | Unchanged |
|---|---|
| Interference from other sectors | −5.8 dB |
| Total interference | −2.2 dB |
| Estimated increase in rate | 66% |
| Average MS transmission power | −6.2 dB |
| Peak MS transmission power | −7.9 dB |

Interference from the same sector is unchanged because the total rate remains the same. However, interference from other sectors/cells is reduced by about 5.8 dB, which in turn reduces the total interference by about 2.2 dB. Because the channel capacity is roughly proportional to the SIR in a low-SNR regime as in the uplink in HDR, this can be interpreted as either a 66% increase in the aggregate rate per sector (by increasing coding rates) or a 66% increase in the number of supportable MS's with the same individual average rate (by decreasing their power).

At the same time, this enhanced scheme also reduces the transmission power of MS's. The average transmission power is reduced by about 6.2 dB and the peak transmission power (transmission power of the MS with the most power) is reduced by about 7.9 dB. Note that these two gains, 66% increase in the throughput and 6.2 dB reduction in average transmission power, are realizable at the same time, because rate can be increased by just changing the forward error correcting scheme of each mobile without changing its transmission power because of the improvement in the SIR.

Note that the actual gain could be more than 66%, because in this simulation we used the same set of reverse rates to simplify the measurement of the change in the interference when the total rate is unchanged. It would be desirable to have a higher rate than the 153.6 Kbps that is currently the maximum reverse rate, because now we can safely increase the reverse rate to more than 153.6 Kbps for MS's that are close to the BS.

Figure 4:
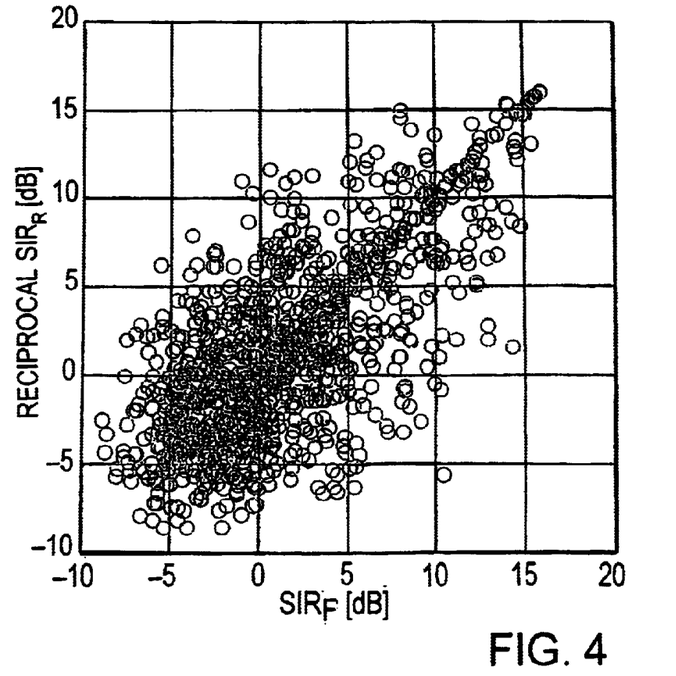

So far, we assumed that MS's are moving at high speed. In this case, Rayleigh fading will have only an average effect for both the forward and the reverse links, which means we can estimate the MS's transmission power from its forward SIR more accurately. When MS's are standing or moving very slowly (scenario B), Rayleigh fading will not change much within one frame and it will affect forward and reverse links almost independently. In this case, the accuracy in estimating the MS's transmission power from its forward-link SIR will be smaller. FIG. 4 shows the decreased correlation between the two SIR's. Using the same assumption as the previous simulation but with additional Rayleigh fading that is independent in forward and reverse links, we get about 38% gain in the throughput.

| Interference from the same sector | Unchanged |
|---|---|
| Interference from other sectors | −3.0 dB |
| Total interference | −1.4 dB |
| Estimated increase in rate | 38% |
| Average MS transmission power | −3.5 dB |
| Peak MS transmission power | −3.7 dB |

This gain would be reduced further when the aggregate reverse rate is small compared to capacity, because in this case the thermal noise will be more significant, and the reduction in the interference from MS's in other sectors will have a smaller effect. For example, when a sector is about half loaded (when the thermal noise is about the same strength as the received interference power), the increase in SIR would be 25% and 16% for scenarios A and B, respectively, if all the other assumptions remain the same.

8. Conclusions

The average throughput of the reverse link in HDR may be increased by allocating different rates among MS's. The technique can be used in any wireless communication system, including 1×EV-DO, CDMA-2000 and 1×EV-DV, where variable rate data is transmitted from mobiles to base stations.

Other implementations are within the scope of the following claims.

What is claimed is:

1. A method comprising
   determining a forward-link data rate at a mobile device at which the mobile device desires to receive its forward-link data packets from a base station,
   transmitting information conveying the forward-link data rate from the mobile station to the base station,
   determining a maximum reverse data rate at the base station based on the forward-link data rate,
   transmitting information conveying the maximum reverse data rate from the base station to the mobile device,
   determining at the mobile station its operational reverse rate between zero and the maximum reverse data rate, and transmitting data packets by the mobile station at the determined operational reverse rate.

2. The method of claim 1 further comprising averaging the forward-link data rate over a certain period of time, and wherein determining the maximum reverse data rate further comprises determining the maximum reverse data rate in a sector of the base station using the averaged forward-link data.

3. The method of claim 1 in which the transmitted information from the base station to the mobile device comprises one or more rate control bits from the base station to the mobile device.

4. The method of claim 3 in which the one or more reverse rate control bits comprise a first bit configuration indicating an increase to a maximum reverse data rate and a second bit configuration indicating a decrease to the maximum reverse data rate.

5. The method of claim 4 in which the one or more reverse rate control bits further comprise a third bit configuration indicating no change in the maximum reverse data rate.

6. The method of claim 4 further comprising transmitting, by the mobile device, data at a rate between zero and the maximum reverse data rate based on the one or more reverse rate control bits received from the base station.

7. The method of claim 1 wherein determining the maximum reverse data rate further comprises determining the maximum reverse rate so that an aggregate rate associated with all mobile devices in one or more sectors is maximized.

8. The method of claim 1 wherein determining the maximum reverse data rate further comprises determining the maximum reverse rate of the mobile device in accord with a condition.

9. The method of claim 8 in which the condition includes fairness among mobile devices.

10. The method of claim 9 in which the fairness is defined as a ratio of highest and lowest user throughputs.

11. The method of claim 1 in which the base station has one or more sectors.

12. The method of claim 1 wherein determining the operational reverse rate further comprises determining the operational reverse rate based on a current transmission rate of the mobile device.

13. The method of claim 1 wherein determining the operational reverse rate further comprises determining the operational reverse rate based on an amount of data to transmit at the mobile device.

14. The method of claim 1 wherein determining the operational reverse rate further comprises determining the operational reverse rate based on transition probabilities to increase or decrease the rate and on sector rate control information received from one or more base stations.

15. The method of claim 14 in which values of the transition probabilities are transmitted from one or more base stations.

16. The method of claim 14 in which the sector rate control information is defined per sector and comprises a first bit configuration indicating a probabilistic increase to the mobile device's operational reverse rate and a second bit configuration indicating a probabilistic decrease to the mobile device's operational reverse rate.

17. The method of claim 1 wherein the base station is a first base station, the method further comprising
receiving, at one or more base stations other than the first base station, the information conveying the forward-link data rate and a requested reverse data rate from the mobile station; and
relaying the information to the first base station.

18. A method comprising
determining a maximum reverse data rate based on an estimated amount of interference a mobile device is causing to one or more sectors other than the sectors serving the mobile device,
transmitting reverse rate information conveying the maximum reverse data rate between a base station and the mobile device, the base station including one or more sectors, and
transmitting sector rate control information from the one or more sectors to all mobile devices in that respective sector,
determining an operational reverse rate at the mobile station between zero and the maximum rate based on the sector rate control information, and
transmitting data packets by the mobile station at the determined operational reverse rate without further consulting the base station.

19. The method of claim 18 wherein determining the maximum reverse data rate further comprises determining the estimated amount of interference based on a forward-link SIR for the mobile device.

20. The method of claim 19 further comprising averaging the forward-link SIR over a period of time.

21. The method of claim 19 further comprising determining the forward-link SIR based on received pilot power at the mobile device from one or more sectors.

22. The method of claim 19 further comprising determining the forward-link SIR based on total power received at the mobile device.

23. The method of claim 18 wherein determining the maximum reverse rate further comprises determining the maximum reverse rate based on a queue status of the mobile device.

24. The method of claim 18 wherein determining the maximum reverse rate further comprises determining the maximum reverse rate based on a status of the sector in which the mobile device is operating.

25. The method of claim 24 in which the status of the sector is associated with a number of mobile devices.

26. The method of claim 24 in which the status of the sector is associated with a set of reverse rates of other devices operating in the sector.

27. The method of claim 18 wherein transmitting the reverse rate information further comprises transmitting the reverse rate information comprising one or more rate control bit or bits from one or more base stations to the mobile device.

28. The method of claim 27 in which the one or more reverse rate control bit or bits comprise a first bit configuration indicating an increase to the maximum reverse rate and a second bit configuration indicating a decrease to the maximum reverse rate.

29. The method of claim 28 in which the one or more reverse rate control bit or bits further comprises a third bit configuration indicating no change in the maximum reverse rate.

30. The method of claim 27
wherein determining its operational reverse rate further comprises determining, by the mobile device, its operational reverse rate based on the rate control bits received from one or more base stations, the method further comprising,
storing, by the mobile device, its operational reverse rate.

31. The method of claim 18 wherein determining the operational reverse rate further comprises determining the operational reverse rate based on a current rate of the mobile device.

32. The method of claim 18 wherein determining the operational reverse rate further comprises determining the operational reverse rate based on an amount of data to transmit at the mobile device.

33. The method of claim 18 wherein determining the operational reverse rate further comprises determining the operational reverse rate based on transition probabilities to increase or decrease the rate and on sector rate control information received from one or more base stations.

34. The method of claim 33 further comprising transmitting values of the transition probabilities from one or more base stations.

35. The method of claim 34 wherein determining the maximum reverse rate further comprises determining the maximum reverse rate of the mobile device so that an aggregate rate associated with all mobile devices in one or more sectors is maximized.

36. The method of claim 34 wherein determining the maximum reverse data rate further comprises determining the maximum reverse data rate of the mobile device in accord with a condition.

37. The method of claim 36 in which the condition includes fairness among mobile devices.

38. The method of claim 37 in which the fairness is defined as a ratio of highest and lowest user throughputs.

39. A method comprising,
determining a forward-link data rate at a mobile device at which the mobile device desires to receive its forward-link data packets from a base station,
determining a requested reverse data rate at the mobile station at which the mobile device desires to transmit its reverse-link data packets to the base station,
transmitting information conveying the forward-link data rate and the requested reverse data rate from the mobile station to the base station,
determining at the base station a reverse data rate between zero and the requested reverse data rate based on the forward-link data rate information,
transmitting information conveying the determined reverse data rate from the base station to the mobile device, and
transmitting data packets by the mobile station at the determined reverse rate.

40. The method of claim 39 wherein the base station comprises one or more sectors.

41. The method of claim 39 wherein the base station is a first base station, the method further comprising
receiving, at one or more base stations other than the first base station, the information conveying the forward-link data rate and the requested reverse data rate from the mobile station; and
relaying the information to the first base station.

42. The method of claim 39 wherein one or more base stations including the base station receive the reverse-link data packets from the mobile station.

43. The method of claim 39 further comprising averaging the requested forward-link data rate over a certain period of time, and
wherein determining at the base station a reverse data further comprises determining the reverse data rate at the base station using the averaged forward-link data rate.

44. The method of claim 39 wherein determining the requested reverse rate further comprises determining the requested reverse rate at the mobile device based on a queue status of the mobile device.

45. The method of claim 39 wherein determining the requested reverse rate further comprises determining the requested reverse rate at the mobile device based on a status of a sector in which the mobile device is operating.

46. The method of claim 45 in which the status of the sector is associated with a number of mobile devices.

47. The method of claim 46 in which the status of the sector is associated with a set of reverse rates of other devices operating in the sector.

48. A method comprising
determining a forward-link data rate at a mobile device at which the mobile device desires to receive its forward-link data packets from a base station,
transmitting information conveying the desired forward-link data rate from the mobile station to the base station,
determining at the base station a reverse data rate based on the desired forward-link data rate information,
transmitting information conveying the determined reverse data rate from the base station to the mobile device, and
transmitting data packets by the mobile station at the determined rate.

49. The method of claim 48 wherein the base station comprises one or more sectors.

50. The method of claim 48 wherein the base station is a first base station, the method further comprising
receiving, at one or more base stations other than the first base station, the information conveying the forward-link data rate and the requested reverse data rate from the mobile station; and
relaying the information to the first base station.

51. The method of claim 48 wherein one or more base stations including the base station receive the reverse-link data packets from the mobile station.

52. The method of claim 48 further comprising averaging the requested forward-link data rate over a certain period of time, and
wherein determining the reverse data rate further comprises determining the reverse data rate at the base station using the averaged forward-link data rate.

* * * * *